(12) United States Patent
Kwon

(10) Patent No.: US 11,518,359 B2
(45) Date of Patent: Dec. 6, 2022

(54) BRAKE APPARATUS FOR VEHICLE

(71) Applicant: HYUNDAI MOBIS CO., LTD., Seoul (KR)

(72) Inventor: Jae Hyun Kwon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 85 days.

(21) Appl. No.: 17/023,316

(22) Filed: Sep. 16, 2020

(65) Prior Publication Data

US 2021/0086742 A1   Mar. 25, 2021

(30) Foreign Application Priority Data

Sep. 20, 2019   (KR) .................. 10-2019-0115929

(51) Int. Cl.
| | | |
|---|---|---|
| *B60T 13/74* | (2006.01) | |
| *B60T 1/06* | (2006.01) | |
| *F16D 65/18* | (2006.01) | |
| *F16D 55/02* | (2006.01) | |
| *F16D 65/00* | (2006.01) | |
| *F16D 125/50* | (2012.01) | |
| *F16D 121/24* | (2012.01) | |
| *F16D 125/48* | (2012.01) | |
| *F16D 125/52* | (2012.01) | |

(52) U.S. Cl.
CPC ............ *B60T 13/746* (2013.01); *B60T 1/065* (2013.01); *F16D 55/02* (2013.01); *F16D 65/0081* (2013.01); *F16D 65/183* (2013.01); *F16D 2121/24* (2013.01); *F16D 2125/48* (2013.01); *F16D 2125/50* (2013.01); *F16D 2125/52* (2013.01)

(58) Field of Classification Search
CPC .... F16D 55/02; F16D 65/0081; F16D 65/183; F16D 2121/24; B60T 13/746
See application file for complete search history.

(56) References Cited

U.S. PATENT DOCUMENTS

| | | | |
|---|---|---|---|
| 6,554,109 | B1 | 4/2003 | Olschewski et al. |
| 6,761,252 | B1 * | 7/2004 | Weiler .................. B60T 13/741 188/71.8 |
| 8,205,725 | B2 | 6/2012 | Sakashita |
| 10,823,242 | B2 | 11/2020 | Choi |

(Continued)

FOREIGN PATENT DOCUMENTS

| | | |
|---|---|---|
| DE | 69925489 T2 | 5/2006 |
| DE | 102009023432 | 12/2009 |
| DE | 102018251782 | 7/2019 |

*Primary Examiner* — Nicholas J Lane
(74) *Attorney, Agent, or Firm* — H.C. Park & Associates, PLC

(57) ABSTRACT

A parking brake apparatus for a vehicle including a motor section receiving electric power, and generating power; a power transmission section rotated by driving the motor section; a pair of pressing units receiving power from the power transmission section and pressing a brake pad; a load transmission unit installed between the pair of pressing units, connected to each of the pair of pressing units, and transmitting a pressing load of any one of the pair of pressing units to the other pressing unit; and a caliper housing having installed therein the pressing units, wherein the motor section is mounted to an upper surface of the caliper housing.

4 Claims, 12 Drawing Sheets

(56) References Cited

U.S. PATENT DOCUMENTS

| | | | | |
|---|---|---|---|---|
| 2004/0074716 | A1* | 4/2004 | Brumfield | F16D 55/22 |
| | | | | 188/218 A |
| 2016/0290424 | A1* | 10/2016 | Gutelius | F16D 65/183 |
| 2017/0167553 | A1* | 6/2017 | Sim | F16D 65/183 |
| 2019/0063527 | A1 | 2/2019 | Thomas | |

* cited by examiner

BRAKE APPARATUS FOR VEHICLE

CROSS-REFERENCE TO RELATED APPLICATION

This application claims priority from and the benefit of Korean Patent Application No. 10-2019-0115929, filed on Sep. 20, 2019, which is hereby incorporated by reference for all purposes as if set forth herein.

BACKGROUND

Field

Exemplary embodiments of the present disclosure relate to a parking brake apparatus for a vehicle, and more particularly, to a parking brake apparatus for a vehicle capable of uniformly transmitting loads to a brake pad.

Discussion of the Background

In general, an actuator of an electronic parking brake for a vehicle is constructed by a motor and a power transmission device for operating friction pads installed in a caliper of a disc brake apparatus when parking.

When a driver pushes a parking brake switch, the rotational force of a motor of the actuator is transmitted to an input shaft of the caliper through the power transmission device such as a reduction gear. Through the rotation of the input shaft, a pressure connection sleeve is moved forward, and by the forward movement of the pressure connection sleeve, a piston which accommodates the pressure connection sleeve and a caliper housing are moved toward each other, such that two friction pads mounted to the piston and the caliper housing are pressed against both surfaces of a disc to restrain the rotation of the disc.

In the case where a plurality of pistons are provided and receive a driving force from a single actuator, loads may be non-uniformly transmitted to the plurality of pistons. In this case, uneven wear of friction pads may be caused, and the braking performance may be degraded.

SUMMARY

Various embodiments are directed to a parking brake apparatus for a vehicle capable of uniformly transmitting loads to a brake pad by a load transmission unit.

In an embodiment, a parking brake apparatus for a vehicle may include: a motor section receiving electric power, and generating power; a power transmission section rotated by driving the motor section; a pair of pressing units receiving power from the power transmission section and pressing a brake pad; a load transmission unit installed between the pair of pressing units, connected to each of the pair of pressing units, and transmitting a pressing load of any one of the pair of pressing units to the other pressing unit; and a caliper housing having installed therein the pressing units, wherein the motor section is mounted to an upper surface of the caliper housing.

The motor section may be mounted to the upper surface of the caliper housing while being surrounded by a motor housing.

A motor mounting pocket may be formed on the upper surface of the caliper housing, and the motor housing may be inserted into the motor mounting pocket.

The parking brake apparatus may further include a cover unit detachably coupled to the caliper housing to cover the motor housing.

The cover unit may have one end which is coupled to a side of the caliper housing and the other end which is coupled to an opposite side of the caliper housing.

The cover unit may be disposed to be spaced apart from the upper surface of the caliper housing.

A motor inserting part which surrounds a side of the motor housing inserted therein may be formed on the upper surface of the caliper housing.

The parking brake apparatus may further include a cover unit detachably coupled to the caliper housing to cover the motor inserting part.

The cover unit may have one end which is coupled to a side of the caliper housing and the other end which is coupled to an opposite side of the caliper housing.

The cover unit may be disposed to be spaced apart from the upper surface of the caliper housing.

In the parking brake apparatus for a vehicle according to the present disclosure, when a pressing load is concentrated on any one of a plurality of pressing units, a load transmission unit may transmit the pressing load to the remaining pressing unit, so that the pressing units may press a brake pad with uniform loads.

Also, according to the present disclosure, it is possible to solve a problem caused in that interference with surrounding parts occurs as a driving unit is mounted to the lower surface of a caliper housing.

DETAILED DESCRIPTION OF THE ILLUSTRATED EMBODIMENTS

Hereinafter, an automatic transmission for a vehicle will be described below with reference to the accompanying drawings through various examples of embodiments. It should be noted that the drawings are not to precise scale and may be exaggerated in thickness of lines or sizes of components for descriptive convenience and clarity only.

Furthermore, the terms used herein are defined by taking functions of the invention into account and can be changed according to the intention of users or operators or the practice. Therefore, definition of the terms should be made according to the overall disclosures set forth herein.

Figure 1:
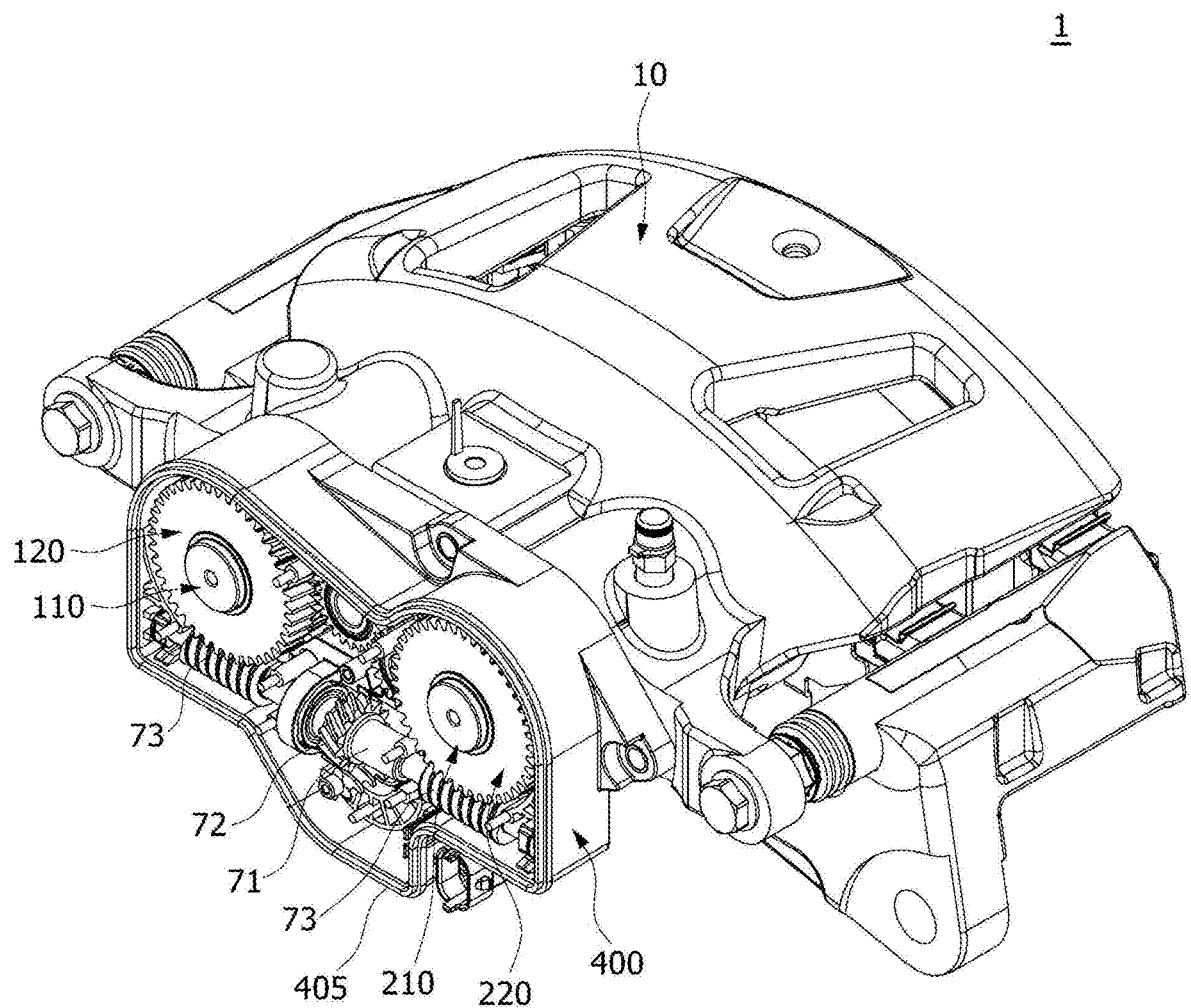
FIG. 1 is a perspective view illustrating a parking brake apparatus for a vehicle in accordance with a first embodiment of the present disclosure.
Figure 2:
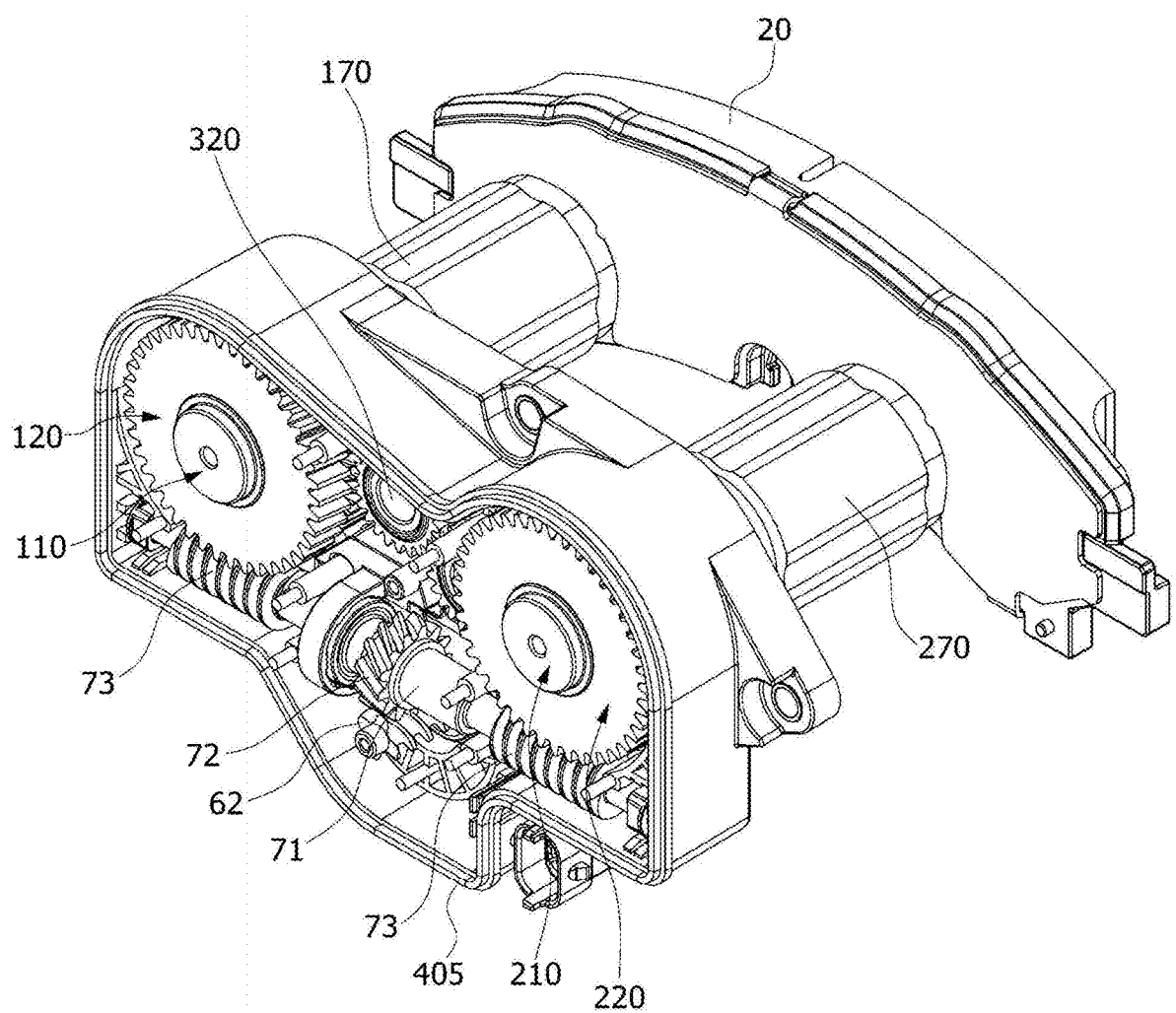
FIG. 2 is a partial perspective view illustrating the parking brake apparatus for a vehicle in accordance with the first embodiment of the present disclosure.
Figure 3:
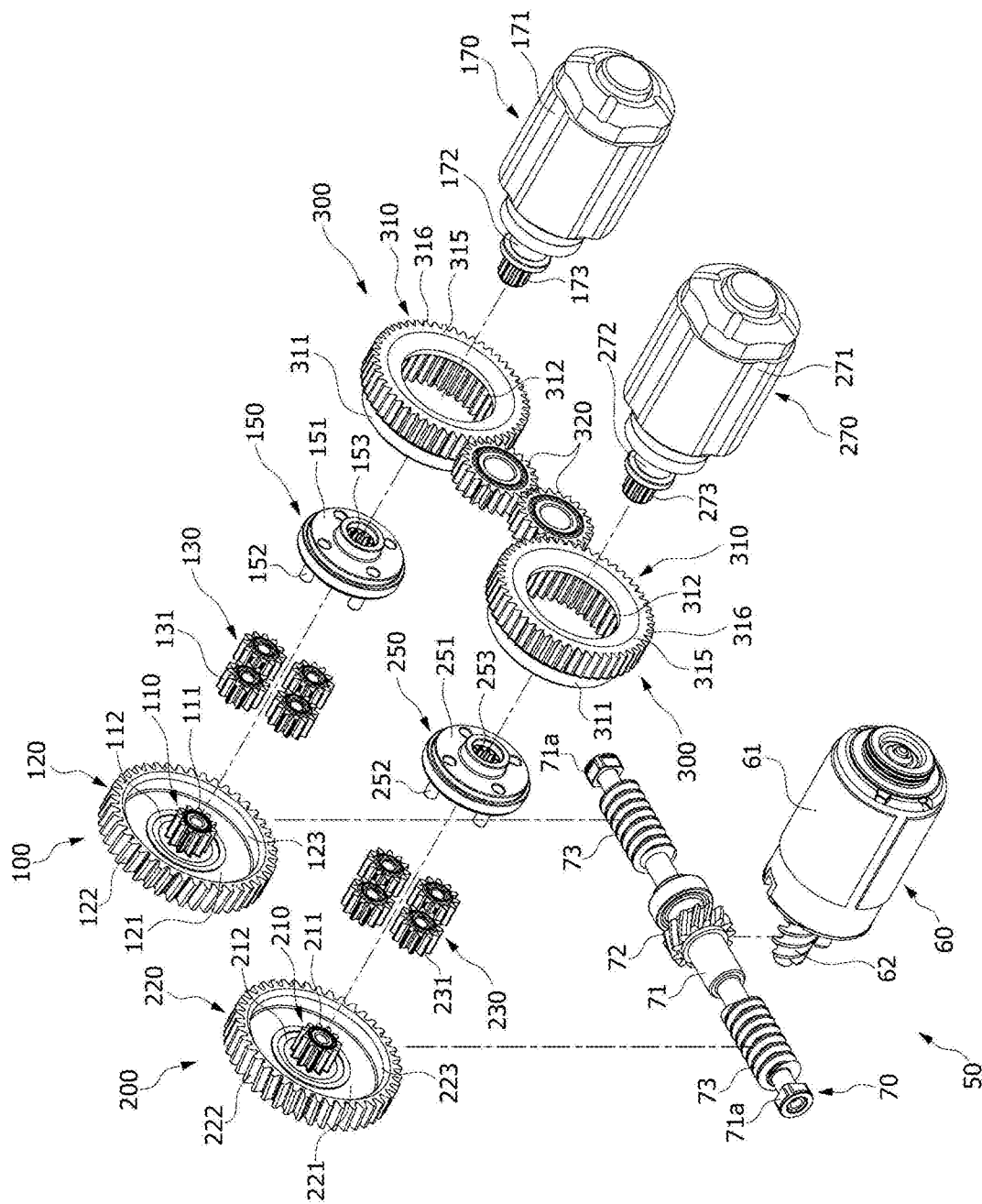
FIG. 3 is a partial exploded view illustrating the parking brake apparatus for a vehicle in accordance with the first embodiment of the present disclosure.
Figure 4:
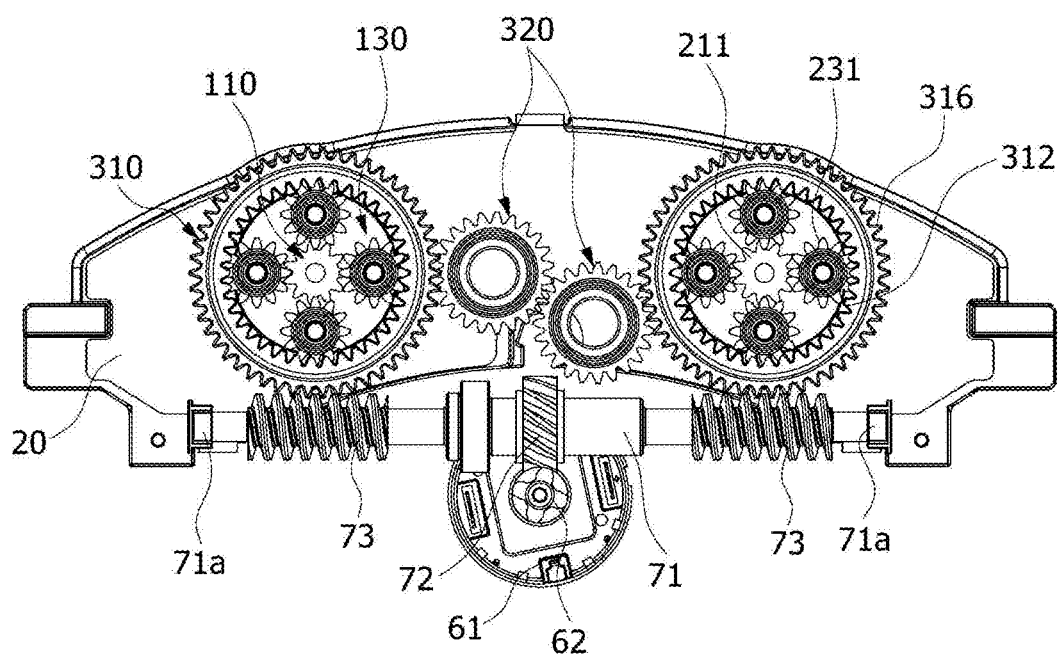
FIG. 4 is a front view illustrating the parking brake apparatus for a vehicle in accordance with the first embodiment of the present disclosure.
Figure 5:
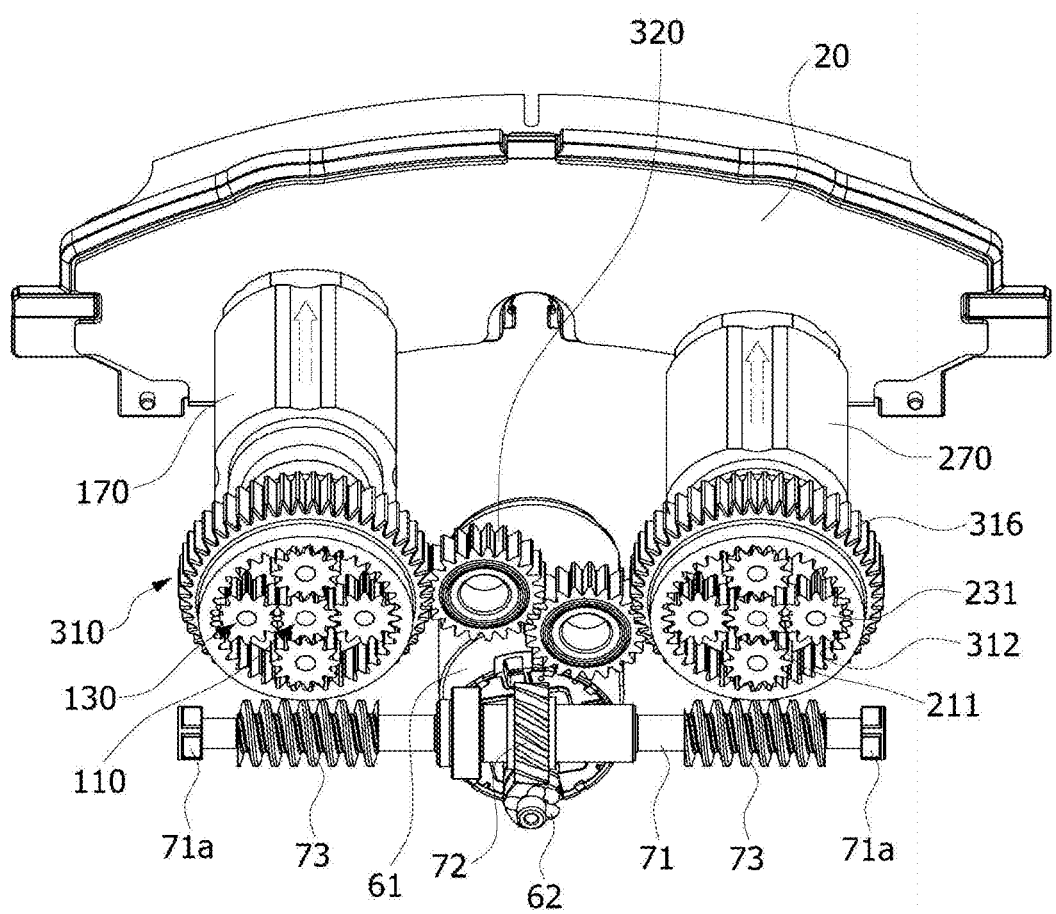
FIGS. 5 to 7 are state views illustrating driving states of the parking brake apparatus for a vehicle in accordance with the first embodiment of the present disclosure.
Figure 6:
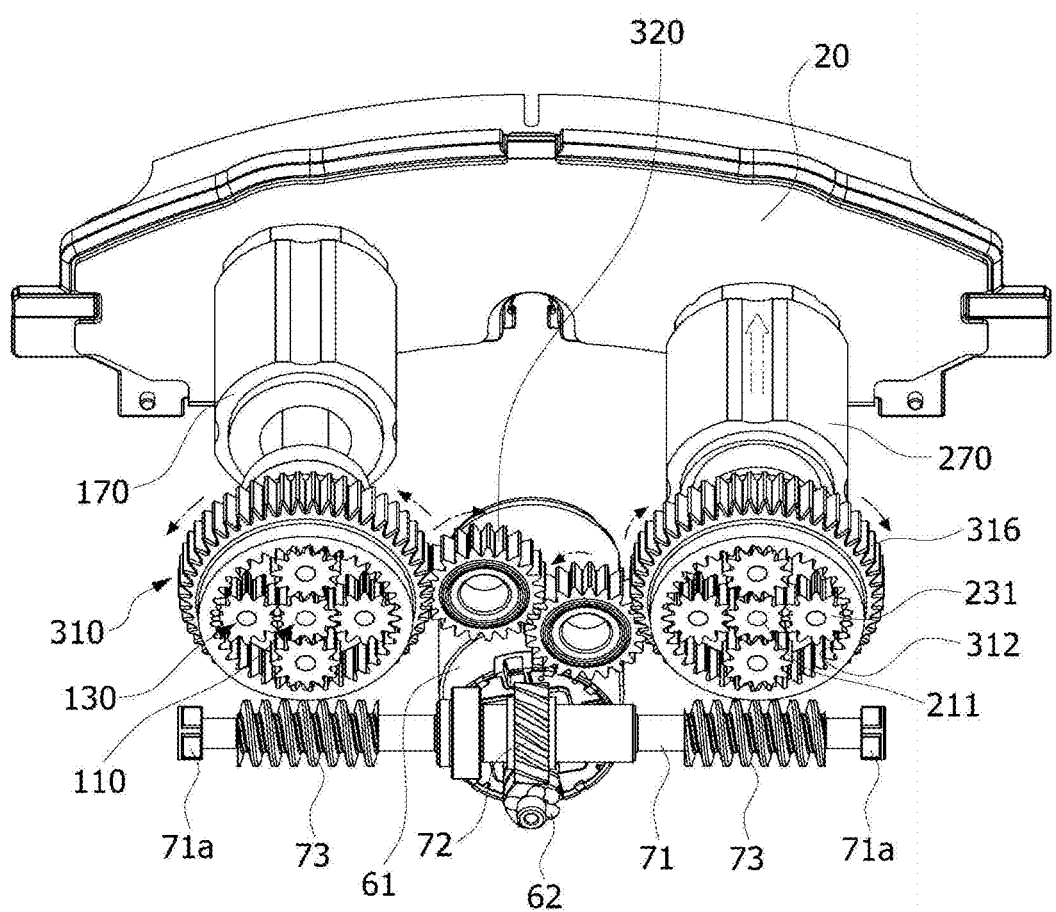
Figure 7:
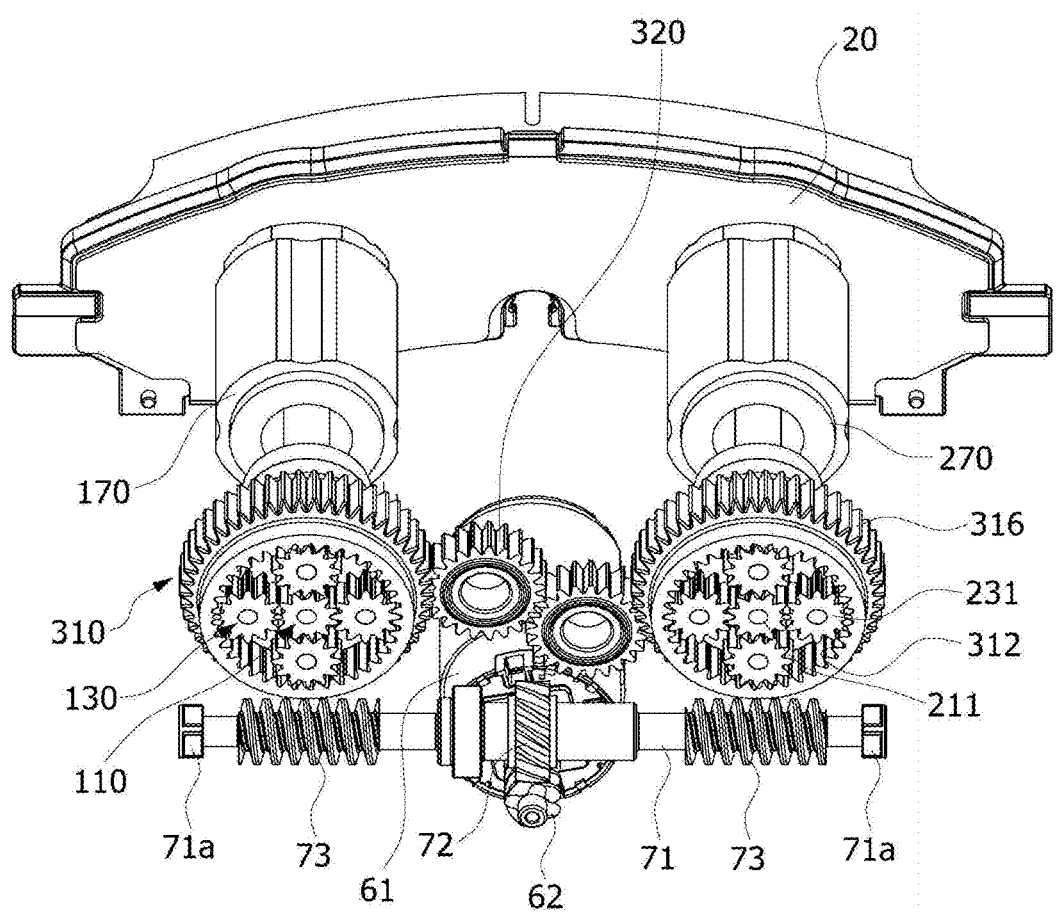

FIG. 1 is a perspective view illustrating a parking brake apparatus for a vehicle in accordance with a first embodiment of the present disclosure. FIG. 2 is a partial perspective view illustrating the parking brake apparatus for a vehicle in accordance with the first embodiment of the present disclosure. FIG. 3 is a partial exploded view illustrating the parking brake apparatus for a vehicle in accordance with the first embodiment of the present disclosure. FIG. 4 is a front view illustrating the parking brake apparatus for a vehicle in accordance with the first embodiment of the present disclosure. FIGS. 5 to 7 are state views illustrating driving states of the parking brake apparatus for a vehicle in accordance with the first embodiment of the present disclosure.

Referring to FIGS. 1 to 5, a parking brake apparatus 1 for a vehicle in accordance with the first embodiment of the present disclosure includes a driving unit 50, pressing units 100 and 200, and a load transmission unit 300.

The driving unit 50 includes a motor section 60 which receives electric power from the outside and generates power. The motor section 60 includes a motor body 61 which generates power and a driving gear 62 which is rotated by the motor body 61.

In the present embodiment, the driving gear 62 is formed in the shape of a worm gear, but the shape thereof may be replaced with other gear shapes or the likes as long as the driving gear 62 can transmit power to the pressing units 100 and 200 or a power transmission section 70.

The driving unit 50 further includes a power transmission section 70. That is to say, the motor section 60 of the driving unit 50 may indirectly transmit generated power to the pressing units 100 and 200 through the power transmission section 70.

The power transmission section 70 includes a transmission shaft 71, a transmission worm wheel 72, and transmission worm gears 73. The transmission worm wheel 72 is meshed with the driving gear 62 and receives power from the driving gear 62.

The transmission worm wheel 72 is disposed at the middle portion of the transmission shaft 71, and the transmission worm gears 73 are disposed at both sides of the transmission worm wheel 72, respectively. Therefore, if the transmission worm wheel 72 is rotated by the driving gear 62, each of the transmission worm gears 73 at both ends of the transmission shaft 71, which are connected to the transmission worm wheel 72, is rotated in an interlocked manner.

As such, according to the present embodiment, even though one transmission worm wheel 72 is rotated using one motor section 60, the two transmission worm gears 73 which are connected to the transmission worm wheel 72 may be simultaneously rotated, which makes it possible to simultaneously provide power to the pair of pressing units 100 and 200.

In other words, the power transmission section 70 has a structure in which one transmission worm wheel 72 is installed at the middle portion of the transmission shaft 71 and the pair of transmission worm gears 73 are connected to the transmission worm wheel 72 and are installed at both sides of the transmission worm wheel 72, respectively, and thus, can simultaneously transmit the same force to each of the pair of pressing units 100 and 200.

In addition, since power can be transmitted by including only the transmission worm wheel 72 and the transmission worm gears 73, the structure of the power transmission section 70 may be simplified, whereby the assemblability and operational reliability may be improved and an installation space may be reduced.

In addition, by adjusting the spacing between the transmission worm gears 73 disposed at both sides of the transmission worm wheel 72, the spacing between the pressing units 100 and 200 may be adjusted.

Referring to FIGS. 1 to 3, the parking brake apparatus 1 for a vehicle in accordance with the present embodiment includes a mounting case 400 and a mounting cover (not illustrated).

The driving unit 50, the pressing units 100 and 200 and the load transmission unit 300 are disposed in the mounting case 400. The mounting cover is detachably coupled to the mounting case 400, and closes one side opening of the mounting case 400 to prevent foreign matters from entering the inside of the mounting case 400.

The mounting case 400 has a driving unit mounting protrusion 405. The driving unit mounting protrusion 405 is formed to protrude outward out of the other portion of the mounting case 400 so as to secure a mounting space for the driving unit 50.

In the present embodiment, the driving unit mounting protrusion 405 protrudes downward from the lower portion of a caliper housing 10 as illustrated in FIG. 1. Therefore, a marginal space in which the driving unit 50, in detail, the motor body 61 and the driving gear 62, may be disposed under the power transmission unit 70 is secured.

The pressing units 100 and 200 in accordance with the first embodiment of the present disclosure are installed in a caliper housing 10, receive power from the driving unit 50, and press a brake pad 20 which is brought into frictional contact with a disc (not illustrated).

A plurality of pressing units 100 and 200 are provided. The plurality of pressing units 100 and 200 are disposed side by side. The pressing units 100 and 200 are symmetrically installed at left and right sides (in FIG. 4) with respect to the center portion of the brake pad 20.

The pressing units 100 and 200 receive power from the driving unit 50, and press the brake pad 20 with the same pressing loads. The brake pad 20 is moved toward the disc by such pressing forces, and a braking force is generated due to the friction between the brake pad 20 and the disc.

The pressing units 100 and 200 in accordance with the first embodiment of the present disclosure include the sun gear sections 110 and 210, the connection gear sections 120 and 220, the planetary gear sections 130 and 230, carrier sections 150 and 250, and the piston sections 170 and 270.

Meanwhile, in the illustration of FIGS. 4 to 7, connection gear bodies 121 and 221 of the connection gear sections 120 and 220 are omitted for the sake of convenience in explanation.

The connection gear sections 120 and 220 include the connection gear bodies 121 and 221, connection worm wheels 122 and 222, and connecting insertion parts 123 and 223.

The connection gear sections 120 and 220 include the connection worm wheels 122 and 222 formed on the outer circumferential surfaces thereof to be meshed with the driving unit 50, specifically, the transmission worm gears 73 of the power transmission section 70, respectively.

Due to this fact, the power generated in the motor section 60 is transmitted to the connection worm wheels 122 and 222 through the power transmission section 70. That is to say, the power of the driving unit 50 is transmitted to the connection gear sections 120 and 220 and rotates the connection gear sections 120 and 220. The connection worm wheels 122 and 222 are formed in the shapes of worm wheels.

The connecting insertion parts 123 and 223 are formed in spaces inside the connection worm wheels 122 and 222. In other words, the connection worm wheels 122 and 222 are formed on the outsides of walls formed on the outer circumferential surfaces of the connection gear bodies 121 and 221, and the connecting insertion parts 123 and 223 are formed in the spaces inside the walls on which the connection worm wheels 122 and 222 are formed.

Ring gear sections 310, specifically, ring gear inner parts 311, are inserted into the connecting insertion parts 123 and 223. The connecting insertion parts 123 and 223 are formed in the shapes of grooves.

The sun gear sections 110 and 210 are rotated by receiving power from the driving unit 50. According to the present embodiment, the sun gear sections 110 and 210 are coupled to the connection gear sections 120 and 220. The sun gear sections 110 and 210 may be rotated through the connection gear sections 120 and 220 which are dynamically connected to the driving unit 50.

The sun gear sections 110 and 210 include sun gears 111 and 211 and sun gear connection bodies 112 and 212.

The sun gear connection bodies 112 and 212 are coupled to the connection gear bodies 121 and 221. The sun gears 111 and 211 are formed at the center portions of the sun gear connection bodies 112 and 212, and are formed in the shapes of gears on the outer circumferential surfaces thereof to be meshed with the planetary gear sections 130 and 230.

The rotation centers of the sun gear sections 110 and 210 are concentric with the rotation centers of the connection gear sections 120 and 220. Therefore, if power is transmitted to the connection gear sections 120 and 220 by the power transmission section 70, the connection gear sections 120 and 220 and the sun gear sections 110 and 210 are rotated about the same rotation axes.

The sun gear sections 110 and 210 are disposed inside the inner circumferential surfaces of the connection gear sections 120 and 220 on which the connecting insertion parts 123 and 223 are formed.

The sun gear sections 110 and 210 may be integrally formed with the connection gear sections 120 and 220. Alternatively, the sun gear sections 110 and 210 may be formed as separate bodies from the connection gear sections 120 and 220, and may be integrated with the connection gear sections 120 and 220 through coupling.

As the sun gear sections 110 and 210 are integrally formed with the connection gear sections 120 and 220 or are integrated with the connection gear sections 120 and 220, if the connection gear sections 120 and 220 which are driven by receiving power from the power transmission section 70 are rotated, the sun gear sections 110 and 210 are also rotated together.

The sun gears 111 and 211 are disposed inside the planetary gear sections 130 and 230, respectively, each of which is provided with a plurality of gears. The planetary gear sections 130 and 230 rotate and revolve while being meshed with the sun gears 111 and 211.

The planetary gear sections 130 and 230 include a plurality of planetary gears 131 and 231. The present embodiment illustrates that the numbers of the planetary gears 131 and 231 each are exemplified as four. However, it is to be noted that the present embodiment is not limited thereto, and thus, the numbers of the planetary gears 131 and 231 may each be three or less or five or more.

The plurality of planetary gears 131 and 231 are disposed at equal angles about the rotation centers of the sun gears 111 and 211. The plurality of planetary gears 131 and 231 are meshed with the sun gears 111 and 211, and rotate and/or revolve when the sun gears 111 and 211 are rotated.

The planetary gear sections 130 and 230 are coupled to the carrier sections 150 and 250. In the case where the plurality of planetary gears 131 and 231 revolve around the sun gears 111 and 211, the carrier sections 150 and 250 are also rotated in a clockwise or counterclockwise direction (in FIG. 4).

As the carrier sections 150 and 250 are rotated, the piston sections 170 and 270 are moved toward the brake pad 20 and press the brake pad 20.

The carrier sections 150 and 250 include carrier bodies 151 and 251, carrier rotation shafts 152 and 252, and carrier connection parts 153 and 253.

The carrier rotation shafts 152 and 252 are formed on the carrier bodies 151 and 251 to project toward the planetary gear sections 130 and 230.

The carrier rotation shafts 152 and 252 are provided in plural numbers that are the same as the numbers of the planetary gears 131 and 231 of the planetary gear sections 130 and 230, and are coupled through the planetary gears 131 and 231 of the planetary gear sections 130 and 230. Due to this fact, the planetary gears 131 and 231 of the planetary gear sections 130 and 230 may perform rotating motion while being rotated on the carrier rotation shafts 152 and 252.

The carrier connection parts 153 and 253 are formed on the inner circumferential surfaces of the carrier bodies 151 and 251, and are connected to piston connection parts 173 and 273 of the piston sections 170 and 270.

In the present embodiment, the carrier connection parts 153 and 253 have grooves, and the piston connection parts 173 and 273 have protrusions which are inserted into the grooves of the carrier connection parts 153 and 253.

Alternatively, the piston connection parts 173 and 273 may have grooves, and the carrier connection parts 153 and 253 may have protrusions which are inserted into the grooves of the piston connection parts 173 and 273.

The carrier connection parts 153 and 253 and the piston connection parts 173 and 273 may be spline-coupled to each other. Of course, the carrier sections 150 and 250 and the piston sections 170 and 270 may be coupled in other ways, for example, screw coupling or the like, in addition to the spline coupling.

The piston sections 170 and 270 are connected with the carrier sections 150 and 250. The piston sections 170 and 270 are rotated together as the carrier sections 150 and 250 are rotated.

The piston sections 170 and 270 include piston bodies 171 and 271, piston shafts 172 and 272, and the piston connection parts 173 and 273.

The piston bodies 171 and 271 are formed to be internally hollow, and are disposed to be capable of being brought into contact with the brake pad 20 by the movement thereof. The piston bodies 171 and 271 may be formed in cylindrical shapes.

The piston bodies 171 and 271 are coupled with the piston shafts 172 and 272, and the piston connection parts 173 and 273 are formed at ends of the piston shafts 172 and 272, that is, ends of the piston shafts 172 and 272 which face the carrier sections 150 and 250.

When the carrier sections 150 and 250 are rotated, the piston connection parts 173 and 273 which are spline-coupled to the carrier connection parts 153 and 253 are rotated, and thereby, the rotational motion of the carrier sections 150 and 250 is converted into the linear motion of the piston sections 170 and 270.

Due to the linear movement of the piston sections 170 and 270, the piston sections 170 and 270 are moved toward the brake pad 20. Therefore, as the piston sections 170 and 270 are brought into contact with the brake pad 20 and press the brake pad 20, a braking force is generated due to the friction between the brake pad 20 and the disc.

The load transmission unit 300 is connected to each of the pair of pressing units 100 and 200, and transmits a pressing load of any one of the pressing units 100 and 200 to the other of the pressing units 100 and 200.

The load transmission unit 300 in accordance with the first embodiment of the present disclosure includes the pair of ring gear sections 310. The load transmission unit 300 may further include one or more transmission gear sections 320.

The pair of ring gear sections 310 are meshed with the planetary gear sections 130 and 230, respectively, to be able to be rotated thereby.

The pair of ring gear sections 310 may be directly meshed with each other. In other words, the pair of ring gear sections 310 may be directly connected with each other without disposing the transmission gear sections 320 therebetween. In this case, the spacing between the pair of ring gear sections 310 illustrated in FIG. 4, that is, the spacing between the connection gear sections 120 and 220 at one side and the other side, is further reduced, and thus, in conformity with this, the spacing between the transmission worm gears 73 at the one side and the other side, which are meshed with the connection gear sections 120 and 220, may be further reduced.

Alternatively, the pair of ring gear sections 310 may be indirectly meshed by the medium of the one or more transmission gear sections 320. Namely, the transmission gear sections 320 may be disposed between the pair of ring gear sections 310 and meshed with the ring gear sections 310.

Referring to FIGS. 3 to 7, the respective ring gear sections 310 may be installed between the planetary gears 131 and 231 and the connection worm wheels 122 and 222.

Each ring gear section 310 includes the ring gear inner part 311 and a ring gear outer part 315.

The ring gear inner parts 311 are disposed outside the planetary gear sections 130 and 230, and internal gear portions 312 may be formed on the inner circumferential surfaces of the ring gear inner parts 311 to be meshed with the planetary gear sections 130 and 230.

The internal gear portion 312 of the ring gear inner part 311 which is installed at one side (the left side in FIG. 5) is meshed with the planetary gear section 130 to be rotated in the clockwise or counterclockwise direction (in FIG. 5), and transmits power to the ring gear section 310, specifically, the ring gear outer part 315, which is disposed at the other side (the right side in FIG. 5), through the transmission gear sections 320.

The ring gear outer part 315 is coupled to the outer surface of the ring gear inner part 311, and an external gear portion 316 is formed on the outer circumferential surface of the ring gear outer part 315 to be meshed with the transmission gear section 320. The ring gear outer part 315 may be integrally formed with the ring gear inner part 311.

As the internal gear portion 312 of the ring gear inner part 311 which is installed at the one side (the left side in FIG. 5) is rotated while being meshed with the planetary gear section 130, the ring gear outer part 315 which is integrally formed with the ring gear inner part 311 is also rotated in the same direction.

Therefore, the rotational force of the ring gear outer part 315 at the one side is transmitted to the ring gear section 310, specifically, the ring gear outer part 315, which is disposed at the other side (the right side in FIG. 5), through the transmission gear sections 320.

The transmission gear sections 320 are rotated by being meshed with the external gear portions 316 which are formed on the ring gear sections 310, specifically, the ring gear outer parts 315, and transmit the rotational power of the ring gear section 310 disposed at the one side to the ring gear section 310 disposed at the other side.

The rotational power transmitted to the ring gear section 310 at the other side is transmitted to the carrier section 250 which is coupled to the planetary gears 231, via the ring gear inner part 311 and the planetary gears 231. As the planetary gears 231 rotate and revolve on the outer circumferential surface of the sun gear 211, the carrier section 250 which is coupled to the planetary gears 231 is rotated, and thus, the piston section 270 is moved toward the brake pad 20.

In the case where pressing loads for pressing the brake pad 20 are non-uniformly applied to the pair of pressing units 100 and 200, specifically, the pair of piston sections 170 and 270, the load transmission unit 300 may transmit a pressing load of the piston section 170 at the one side to the piston section 270 at the other side such that the pair of piston sections 170 and 270 may be brought into contact with the brake pad 20 with uniform pressing loads.

Of course, conversely, a pressing load of the piston section 270 at the other side may be transmitted to the piston section 170 at the one side.

Referring to FIGS. 4 to 7, in the present embodiment, the transmission gear sections 320 are formed in the shapes of spur gears, and are rotated by being meshed with the external gear portions 316 formed on the outer circumferential surfaces of the ring gear outer parts 315.

However, in addition to the shapes of spur gears, the shapes of the transmission gear sections 320 may be replaced with various shapes such as the shapes of bevel gears and the shapes of helical gears whose gear teeth are formed to be inclined at a predetermined angle with respect to the rotation axes of the transmission gear sections 320.

Moreover, while it is illustrated that the transmission gear sections 320 have the shapes of gears, it is to be noted that the disclosure is not limited thereto, and various modifications are possible like a configuration in which the transmission gear sections 320 are connected in the shapes of belts to the pair of ring gear sections 310 and transmit power of the pressing unit 100 at the one side to the pressing unit 200 at the other side.

The number of the ring gear sections 310 of the load transmission unit 300 may be changed. Therefore, the number of the ring gear sections 310 is not limited to two as in the present embodiment, and may be variously changed to one or three or more depending on a distance between the pair of pressing units 100 and 200.

The operation principle of the parking brake apparatus 1 for a vehicle constructed as mentioned above will be described below.

In the parking brake apparatus 1 for a vehicle in accordance with the embodiment of the present disclosure, the plurality of pressing units 100 and 200 press the brake pad 20 to move the brake pad 20 toward the disc, and a braking force is generated due to the contact friction between the brake pad 20 and the disc.

In the embodiment of the present disclosure, two pressing units 100 and 200 are provided. However, it is to be noted that the present disclosure is not limited thereto, and various modifications such as three or more pressing units are possible.

The pressing units 100 and 200 receive power from the driving unit 50, and are linearly reciprocated relative to the brake pad 20.

In detail, when power is generated in the motor section 60 by receiving electric power from the outside, the power transmission section 70 which is connected with the motor section 60 is rotated by receiving power from the motor section 60. The power transmission section 70 simultaneously transmits rotational power to the pair of pressing units 100 and 200.

By driving the motor section 60, the transmission worm wheel 72 is rotated, and accordingly, as the respective transmission worm gears 73 are rotated, the connection gear sections 120 and 220 which are meshed with the transmission worm gears 73 are rotated.

According to the rotation of the connection gear sections 120 and 220, the sun gear sections 110 and 210 are also rotated in an interlocked manner, and the planetary gears 131 and 231 which are meshed with the sun gears 111 and 211 perform rotating motion and at the same time perform revolving motion around the sun gears 111 and 211.

As the planetary gears 131 and 231 perform the revolving motion, the carrier sections 150 and 250 which are coupled to the planetary gears 131 and 231 are rotated in the clockwise or counterclockwise direction. As the carrier sections 150 and 250 are rotated, the piston sections 170 and 270 which are coupled to the carrier sections 150 and 250 are moved toward the brake pad 20 and press the brake pad 20 by being brought into contact with the brake pad 20.

Due to various factors, the power provided from the driving unit 50 may be transmitted more to any one of the pair of pressing units 100 and 200.

As illustrated in FIG. 6, when driving the parking brake apparatus 1 for a vehicle, in the case where power is transmitted more to the pressing unit 100 disposed at the one side (the left side in FIG. 6) than the pressing unit 200 disposed at the other side (the right side in FIG. 6), the piston section 170 at the one side may be brought into contact with the brake pad 20 earlier than the piston section 270 at the other side.

If the piston section 170 at the one side is in a state in which it is already brought into contact with the brake pad 20 and the piston section 270 at the other side is in a state in which it is not yet brought into contact with the brake pad 20, the planetary gear section 130 of the pressing unit 100 at the one side performs only rotating motion. That is to say, the planetary gear section 130 does not perform revolving motion.

Since the power generated by the operation of the driving unit 50 is continuously transmitted to the sun gear 111, the sun gear 111 is continuously rotated. At this time, since the piston section 170 is in the state in which it is already brought into contact with the brake pad 20, the plurality of planetary gears 131 which are meshed with the sun gear 111 do not perform revolving operation but perform only rotating motion.

Since the pressing unit 100, specifically, the piston section 170, which is disposed at the left side in FIG. 6 can no longer be moved toward the brake pad 20, due to a reaction force to this, the planetary gears 131 perform only rotating motion, and the ring gear inner part 311 which is formed with the internal gear portion 312 to be meshed with the planetary gears 131 is rotated in the clockwise or counterclockwise direction.

The reaction force, which is generated in the pressing unit 100 at the one side (the left side in FIG. 6) through the ring gear outer part 315 which is integrally coupled with the ring gear inner part 311, is transmitted to the pressing unit 200 at the other side (the right side in FIG. 6) through the transmission gear sections 320.

In detail, the power provided to the pressing unit 100 at the one side is transmitted to the piston section 270 at the other side through the external gear portion 316 at the other side, the internal gear portion 312 of the ring gear inner part 311, the planetary gear section 230 and the carrier section 250 coupled with the planetary gear section 230.

Accordingly, the power provided from the driving unit 50 is provided to the piston section 270 at the other side which is not yet brought into contact with the brake pad 20, and the linear movement of the piston section 170 at the one side which is already brought into contact with the brake pad 20 is stopped until the piston section 270 at the other side is brought into contact with the brake pad 20.

Thereafter, when both the piston sections 170 and 270 at the one side and the other side are brought into contact with the brake pad 20, the power of the driving unit 50 is provided to the respective piston sections 170 and 270 at the one side and the other side, and the piston sections 170 and 270 at the one side and the other side simultaneously press the brake pad 20 with uniform loads.

Referring to FIGS. 4 to 7, in the case where a pressing load is concentrated on the pressing unit 100 at the one side between the pair of pressing units 100 and 200, the load transmission unit 300 in accordance with the first embodiment of the present disclosure may transmit the pressing load to the pressing unit 200 at the other side such that the pair of pressing units 100 and 200 may press the brake pad 20 toward the disc with uniform pressing loads.

Likewise, in the case where a pressing load is more concentrated on the pressing unit 200 at the other side between the pair of pressing units 100 and 200, the load transmission unit 300 may transmit the pressing load to the pressing unit 100 at the one side such that the pair of pressing units 100 and 200 may press the brake pad 20 toward the disc with uniform pressing loads.

Referring to FIG. 3, the ring gear inner parts 311 may project more toward the sun gear sections 110 and 210 (the left side in FIG. 3) than the ring gear outer parts 315, and may be inserted into the connecting insertion parts 123 and 223 of the connection gear sections 120 and 220.

Due to this fact, it is possible to prevent the ring gear sections 310 from being released from the connection gear sections 120 and 220 or the sun gear sections 110 and 220 when receiving rotational power from the driving unit 50.

As the carrier sections 150 and 250 are spline-coupled to the piston sections 170 and 270, the rotational power of the carrier sections 150 and 250 may be transmitted to the piston sections 170 and 270, specifically, the piston connection parts 173 and 273.

The piston connection parts 173 and 273 are coupled to the piston shafts 172 and 272 which are coupled to the piston bodies 171 and 271, and, by the rotational power received through the carrier sections 150 and 250, cause the piston bodies 171 and 271 to be linearly moved toward the brake pad 20.

Figure 8:
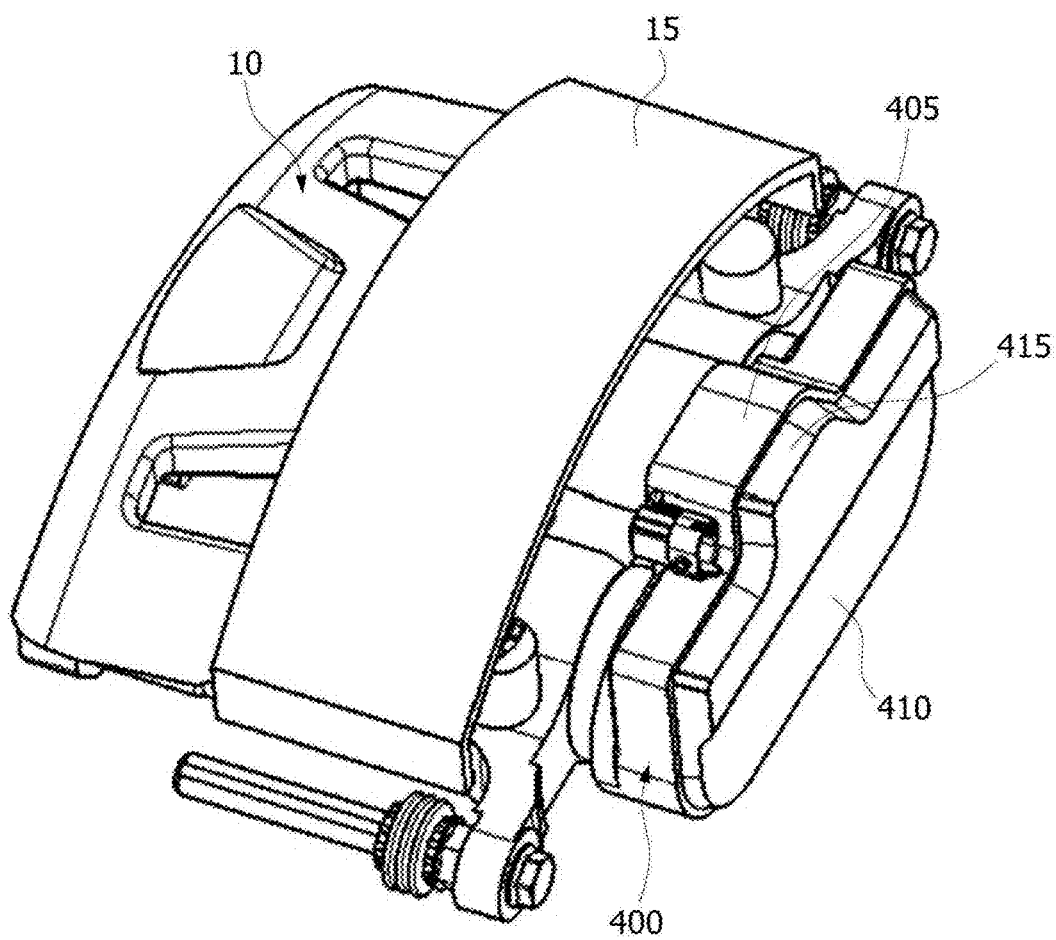
FIG. 8 is a perspective view illustrating a parking brake apparatus for a vehicle in accordance with a second embodiment of the present disclosure.
Figure 9:
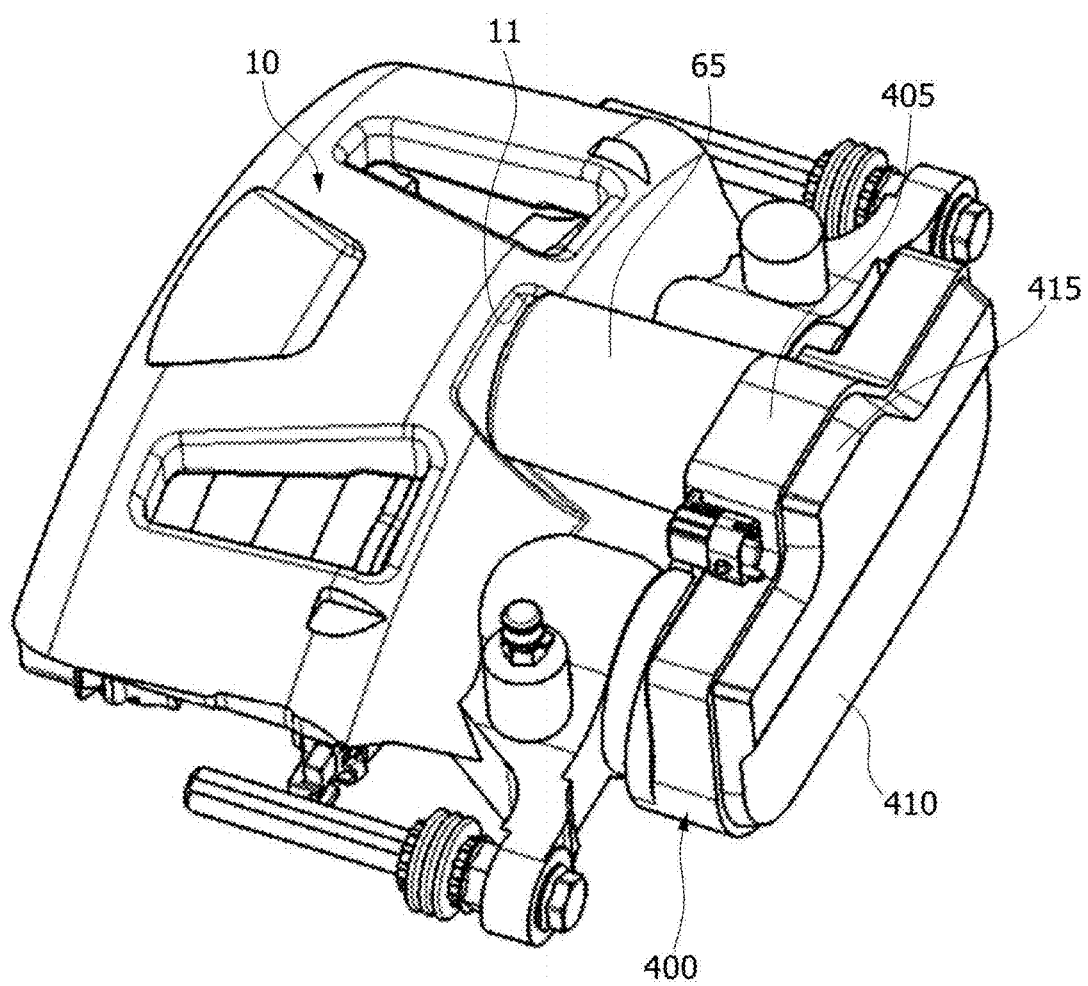
FIG. 9 is a perspective view illustrating a state in which a cover unit is removed in the parking brake apparatus for a vehicle in accordance with the second embodiment of the present disclosure.
Figure 10:
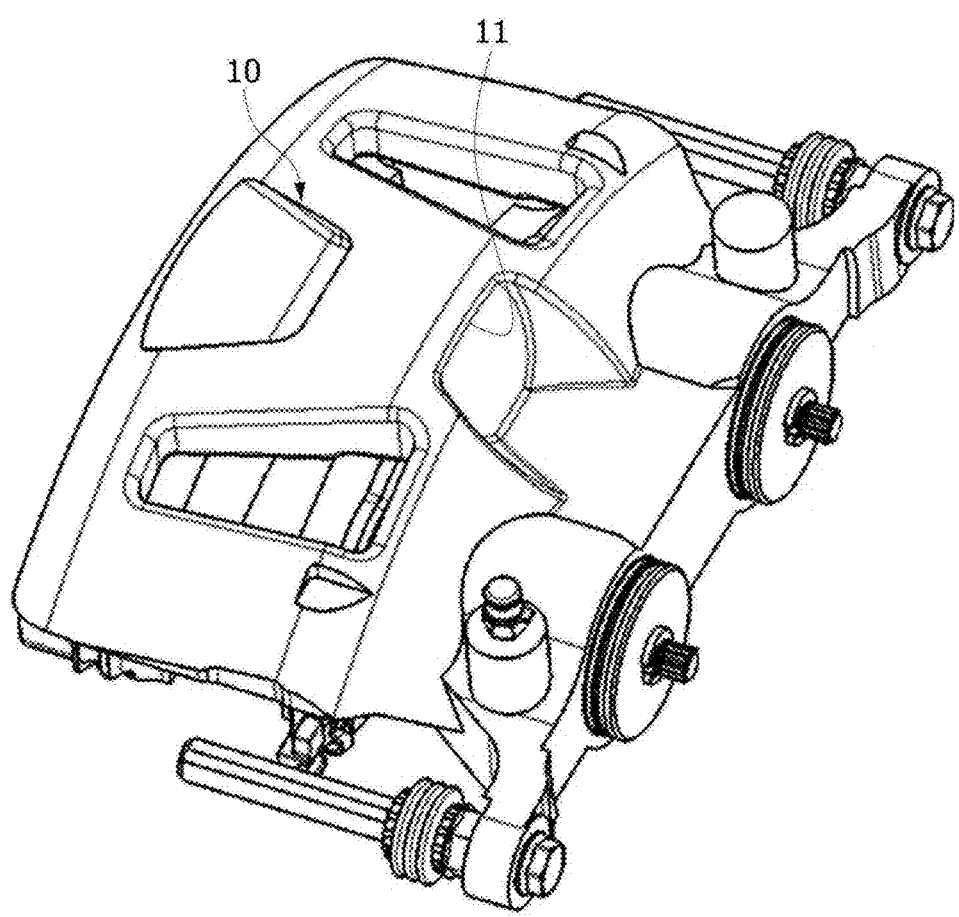
FIG. 10 is a perspective view illustrating the parking brake apparatus for a vehicle in accordance with the second embodiment of the present disclosure, with a mounting case and a motor housing in FIG. 9 omitted.

FIG. 8 is a perspective view illustrating a parking brake apparatus for a vehicle in accordance with a second embodiment of the present disclosure, FIG. 9 is a perspective view illustrating a state in which a cover unit is removed in the parking brake apparatus for a vehicle in accordance with the second embodiment of the present disclosure, and FIG. 10 is a perspective view illustrating the parking brake apparatus for a vehicle in accordance with the second embodiment of the present disclosure, with a mounting case and a motor housing in FIG. 9 omitted.

The parking brake apparatus for a vehicle in accordance with the second embodiment of the present disclosure includes all the components of the parking brake apparatus for a vehicle in accordance with the first embodiment, and further includes a cover unit 15.

Referring to FIGS. 8 to 10, in the parking brake apparatus for a vehicle in accordance with the second embodiment, the driving unit mounting protrusion 405 protrudes upward from the upper portion of the caliper housing 10, unlike the first embodiment.

That is to say, in the parking brake apparatus for a vehicle in accordance with the second embodiment, the mounting case 400 and the driving unit 50, the pressing units 100 and 200 and the load transmission unit 300 which are installed in the mounting case 400 are disposed in an upside-down state as compared to those of the parking brake apparatus for a vehicle in accordance with the first embodiment.

Therefore, in the parking brake apparatus for a vehicle in accordance with the first embodiment, the sun gear sections 110 and 210 are disposed in the mounting case 400 and the power transmission section 70 and the driving gear 62 are sequentially disposed below the sun gear sections 110 and 210, but, in the parking brake apparatus for a vehicle in accordance with the second embodiment, the sun gear sections 110 and 210 are disposed in the mounting case 400 and the power transmission section 70 and the driving gear 62 are sequentially disposed above the sun gear sections 110 and 210.

Since the construction and operation of the parking brake apparatus for a vehicle in accordance with the second embodiment are the same as those of the parking brake apparatus for a vehicle in accordance with the first embodiment except that the disposition of the mounting case 400 and the driving unit 50, the pressing units 100 and 200 and the load transmission unit 300 which are installed in the mounting case 400 is upside-down, the detailed descriptions thereof will be replaced with the descriptions in the parking brake apparatus for a vehicle in accordance with the first embodiment.

In the second embodiment, the mounting case 400 has the driving unit mounting protrusion 405. The driving unit mounting protrusion 405 is formed to protrude outward out of the other portion of the mounting case 400 so as to secure a mounting space for the driving unit 50.

In the second embodiment, the driving unit mounting protrusion 405 protrudes upward from the upper portion of the caliper housing 10 as illustrated in FIG. 9. A mounting cover 410 covers the opening of the mounting case 400. The mounting cover 410 also has a cover protrusion 415 which protrudes upward from the upper portion of the caliper housing 10.

As the driving unit mounting protrusion 405 is formed to protrude upward out of the other portion of the mounting case 400, a marginal space in which the motor body 61 and the driving gear 62 may be disposed over the power transmission section 70 is secured.

A motor housing 65 which extends toward the caliper housing 10 is additionally provided to the mounting case 400. The motor housing 65 covers the motor body 61, and protects the motor body 61 from external impact or the like.

A motor mounting pocket 11 is formed in the upper portion of the caliper housing 10. The motor housing 65 is seated on the upper surface of the caliper housing 10, and the end of the motor housing 65 is inserted into the motor mounting pocket 11. The position of the motor housing 65 is fixed as the end of the motor housing 65 is inserted into the motor mounting pocket 11 and the motor housing 65 is surrounded by a seating surface near the motor mounting pocket 11.

The parking brake apparatus for a vehicle in accordance with the second embodiment further includes the cover unit 15. The cover unit 15 covers the motor housing 65 which is inserted into the motor mounting pocket 11.

The cover unit 15 has one end which is coupled to one side of the caliper housing 10 and the other end which is coupled to the opposite side of the caliper housing 10. The cover unit 15 protects the motor housing 65 from external impact, by covering the motor housing 65 while being disposed to be spaced apart from the upper surface of the caliper housing 10 by a predetermined distance. The cover unit 15 is formed to have a curved surface, and is detachably coupled to the caliper housing 10.

In this way, in the second embodiment, as the driving unit mounting protrusion 405 and the cover protrusion 415 are formed to protrude upward out of the caliper housing 10, the driving unit 50 including the motor body 61 may be mounted to the upper surface of the caliper housing 10.

By this fact, it is possible to solve a problem caused in that interference with surrounding parts occurs as the driving unit 50 is mounted to the lower surface of the caliper housing 10. In addition, since the parking brake apparatus for a vehicle may be installed without changing the structures and positions of surrounding parts including a knuckle, an axle tube, a suspension spring, a U bolt, and so forth, costs may be reduced and convenience in design may be improved.

Figure 11:
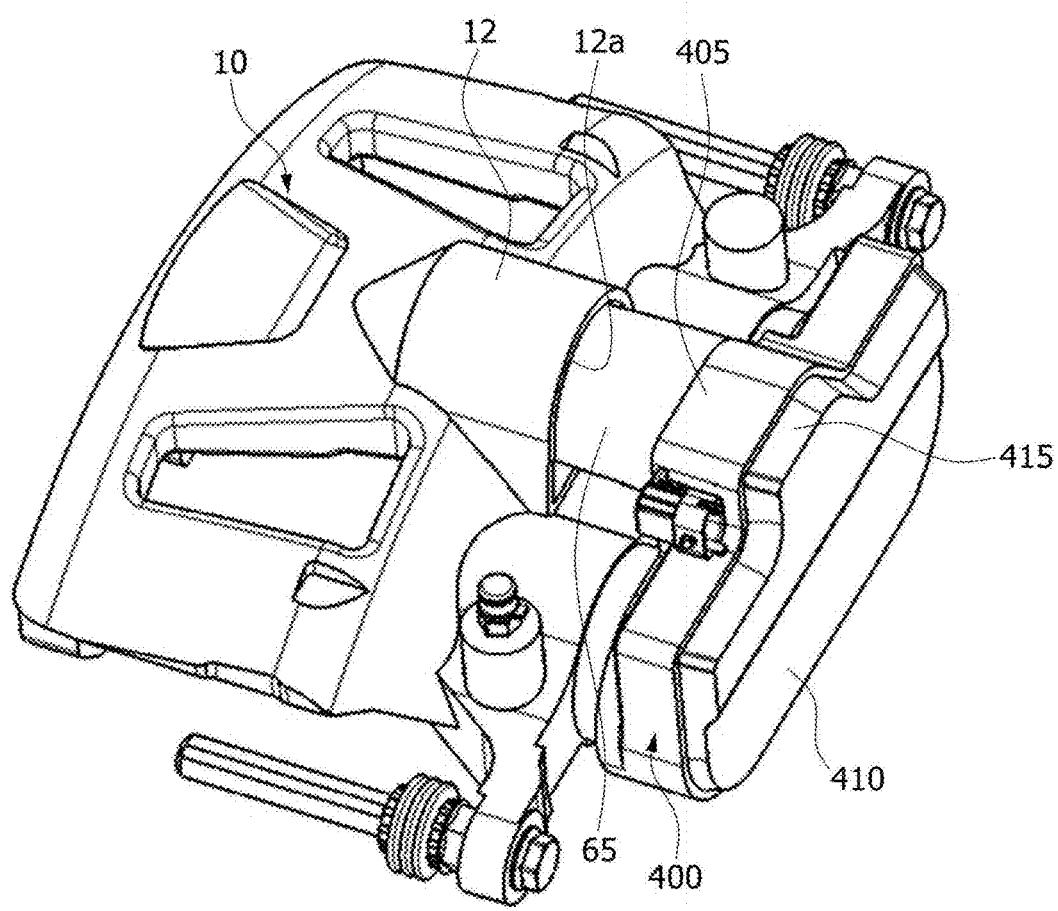
FIG. 11 is a perspective view illustrating a state in which a cover unit is removed in a parking brake apparatus for a vehicle in accordance with a third embodiment of the present disclosure.
Figure 12:
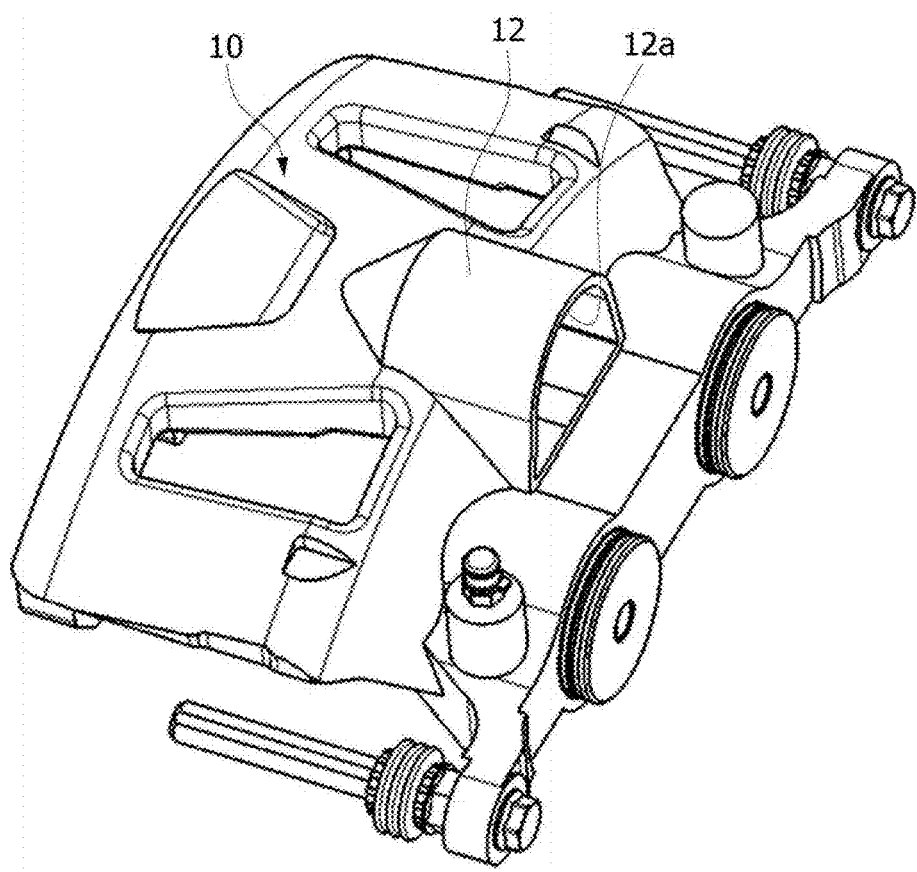
FIG. 12 is a perspective view illustrating the parking brake apparatus for a vehicle in accordance with the third

FIG. 11 is a perspective view illustrating a state in which a cover unit is removed in a parking brake apparatus for a vehicle in accordance with a third embodiment of the present disclosure, and FIG. 12 is a perspective view illustrating the parking brake apparatus for a vehicle in accordance with the third embodiment of the present disclosure, with a mounting case and a motor housing in FIG. 11 omitted.

The parking brake apparatus for a vehicle in accordance with the third embodiment of the present disclosure includes all the components of the parking brake apparatus for a vehicle in accordance with the first embodiment, and further includes a cover unit 15.

Referring to FIGS. 8, 11 and 12, in the parking brake apparatus for a vehicle in accordance with the third embodiment, the driving unit mounting protrusion 405 protrudes upward from the upper portion of the caliper housing 10, unlike the first embodiment.

That is to say, in the parking brake apparatus for a vehicle in accordance with the third embodiment, the mounting case 400 and the driving unit 50, the pressing units 100 and 200 and the load transmission unit 300 which are installed in the mounting case 400 are disposed in an upside-down state as compared to those of the parking brake apparatus for a vehicle in accordance with the first embodiment.

Therefore, in the parking brake apparatus for a vehicle in accordance with the first embodiment, the sun gear sections 110 and 210 are disposed in the mounting case 400 and the power transmission section 70 and the driving gear 62 are sequentially disposed below the sun gear sections 110 and 210, but, in the parking brake apparatus for a vehicle in accordance with the third embodiment, the sun gear sections 110 and 210 are disposed in the mounting case 400 and the power transmission section 70 and the driving gear 62 are sequentially disposed above the sun gear sections 110 and 210.

Since the construction and operation of the parking brake apparatus for a vehicle in accordance with the third embodiment are the same as those of the parking brake apparatus for a vehicle in accordance with the first embodiment except that the disposition of the mounting case 400 and the driving unit 50, the pressing units 100 and 200 and the load transmission unit 300 which are installed in the mounting case 400 is upside-down, the detailed descriptions thereof will be replaced with the descriptions in the parking brake apparatus for a vehicle in accordance with the first embodiment.

In the third embodiment, the mounting case 400 has the driving unit mounting protrusion 405. The driving unit mounting protrusion 405 is formed to protrude outward out of the other portion of the mounting case 400 so as to secure a mounting space for the driving unit 50.

In the third embodiment, the driving unit mounting protrusion 405 protrudes upward from the upper portion of the caliper housing 10 as illustrated in FIG. 11. A mounting cover 410 covers the opening of the mounting case 400. The mounting cover 410 also has a cover protrusion 415 which protrudes upward from the upper portion of the caliper housing 10.

As the driving unit mounting protrusion 405 is formed to protrude upward out of the other portion of the mounting case 400, a marginal space in which the motor body 61 and the driving gear 62 may be disposed over the power transmission section 70 is secured.

A motor housing 65 which extends toward the caliper housing 10 is additionally provided to the mounting case 400. The motor housing 65 covers the motor body 61, and protects the motor body 61 from external impact or the like.

A motor inserting part 12 is formed in the upper portion of the caliper housing 10. The motor housing 65 is seated on the upper surface of the caliper housing 10, and the end of the motor housing 65 is inserted into the motor inserting part 12.

The position of the motor housing 65 is fixed as the end of the motor housing 65 is inserted into the motor inserting part 12 and the motor housing 65 is surrounded by a seating surface near the motor inserting part 12.

The motor inserting part 12 is formed integrally with the caliper housing 10. In the present embodiment, the motor inserting part 12 may be composed of a casting.

The motor inserting part 12 has an insertion hole 12a such that about half of the motor housing 65 may be inserted into the insertion hole 12a. Since the motor housing 65 is inserted deeply into the insertion hole 12a, the motor housing 65 may be protected at not only the end but also the side portion thereof. Accordingly, the motor inserting part 12 may protect the motor housing 65 and the motor body 61 therein from external impact.

The parking brake apparatus for a vehicle in accordance with the third embodiment may further include the cover unit 15. The cover unit 15 covers the motor inserting part 12 into which the motor housing 65 is inserted.

The cover unit 15 has one end which is coupled to one side of the caliper housing 10 and the other end which is coupled to the opposite side of the caliper housing 10. The cover unit 15 protects the motor housing 65 from external impact, by covering the motor housing 65 while being disposed to be spaced apart from the upper surface of the caliper housing 10 by a predetermined distance. The cover unit 15 is formed to have a curved surface, and is detachably coupled to the caliper housing 10.

In this way, in the third embodiment, as the driving unit mounting protrusion 405 and the cover protrusion 415 are formed to protrude upward out of the caliper housing 10, the driving unit 50 including the motor body 61 may be mounted to the upper surface of the caliper housing 10.

By this fact, it is possible to solve a problem caused in that interference with surrounding parts occurs as the driving unit 50 is mounted to the lower surface of the caliper housing 10. In addition, since the parking brake apparatus for a vehicle may be installed without changing the structures and positions of surrounding parts including a knuckle, an axle tube, a suspension spring, a U bolt, and so forth, costs may be reduced and convenience in design may be improved.

Although the disclosure has been disclosed with reference to the embodiments illustrated in the drawings, the embodiments are only for illustrative purposes, and those skilled in the art will appreciate that various modifications and other equivalent embodiments are possible, without departing from the scope and spirit of the disclosure as defined in the accompanying claims. Thus, the true technical scope of the disclosure should be defined by the following claims.

What is claimed is:

1. A brake apparatus for a vehicle, comprising:
   a motor section receiving electric power, and generating power;
   a power transmission section rotated by driving the motor section;
   a pair of pressing units receiving power from the power transmission section and pressing a brake pad;
   a load transmission unit installed between the pair of pressing units, connected to each of the pair of pressing units, and transmitting a pressing load of any one of the pair of pressing units to the other pressing unit; and
   a caliper housing having installed therein the pressing units,
   wherein:
   the motor section is mounted to an upper surface of the caliper housing;
   the motor section is mounted to the upper surface of the caliper housing while being surrounded by a motor housing;
   a motor inserting part which entirely surrounds an outer surface of the motor housing inserted therein is formed on the upper surface of the caliper housing;
   the motor inserting part is formed integrally with the caliper housing;
   each of the pair of pressing units comprises:

a sun gear section rotated by receiving power from the motor section;

a planetary gear section rotated by being meshed with the sun gear section; and a piston section pressing the brake pad by being moved toward the brake pad through receiving rotational power from the planetary gear section;

the load transmission unit comprises a pair of ring gear sections; and each of the pair of ring gear sections is rotatable by being meshed with the planetary gear section.

2. The brake apparatus of claim 1, further comprising a cover unit detachably coupled to the caliper housing to cover the motor inserting part.

3. The brake apparatus of claim 2, wherein the cover unit has one end which is coupled to a side of the caliper housing and the other end which is coupled to an opposite side of the caliper housing.

4. The brake apparatus of claim 3, wherein the cover unit is disposed to be spaced apart from the upper surface of the caliper housing.

\* \* \* \* \*